Jan. 9, 1923.
C. HERRMAN.
CROSS TEST LEVEL AND RULE.
FILED MAR. 19, 1919.
1,441,350
2 SHEETS-SHEET 1
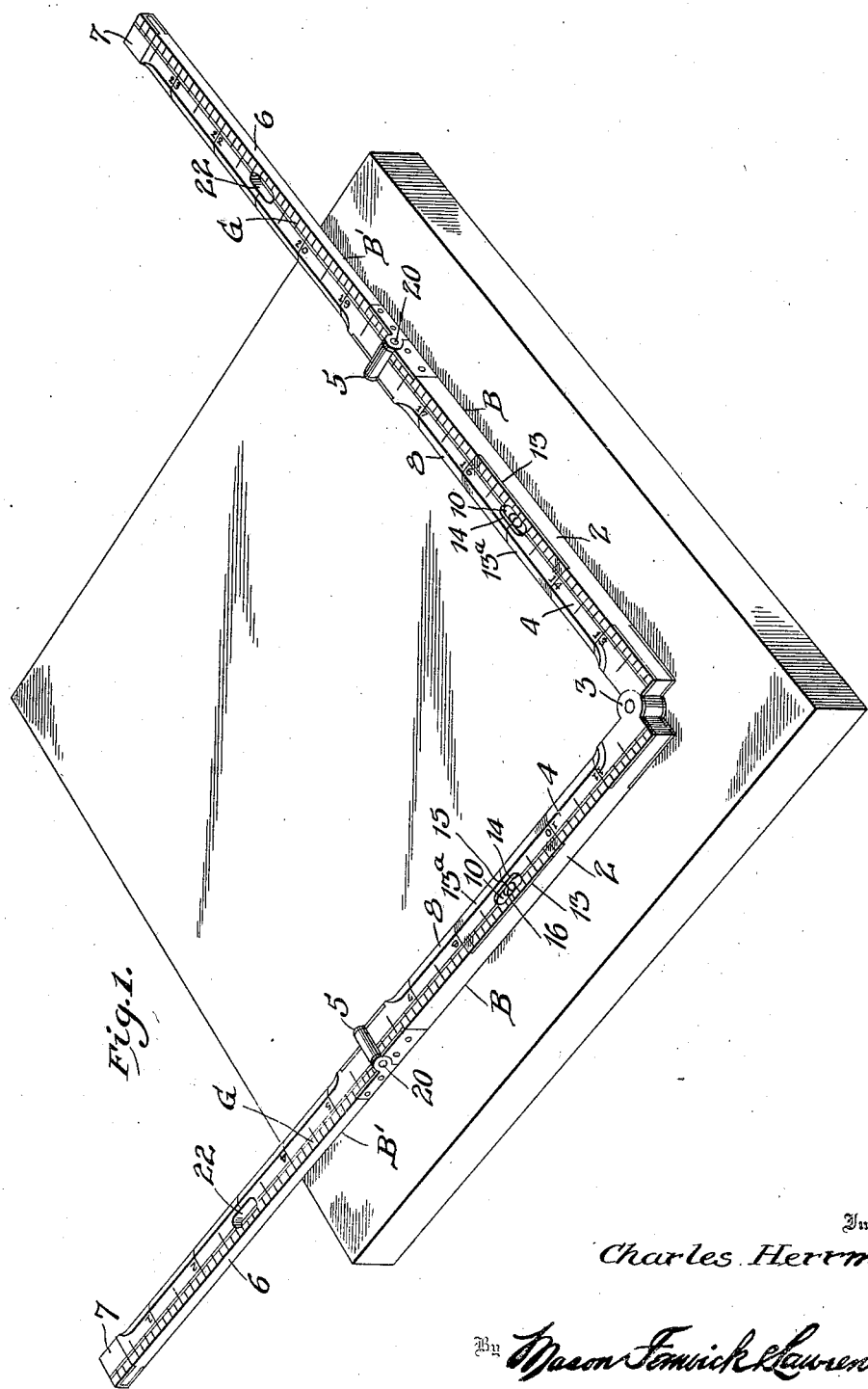
Inventor
Charles Herrman
By Mason Fenwick & Lawrence,
Attorneys Jan. 9, 1923.
C. HERRMAN.
CROSS TEST LEVEL AND RULE.
FILED MAR. 19, 1919.
1,441,350
2 SHEETS-SHEET 2
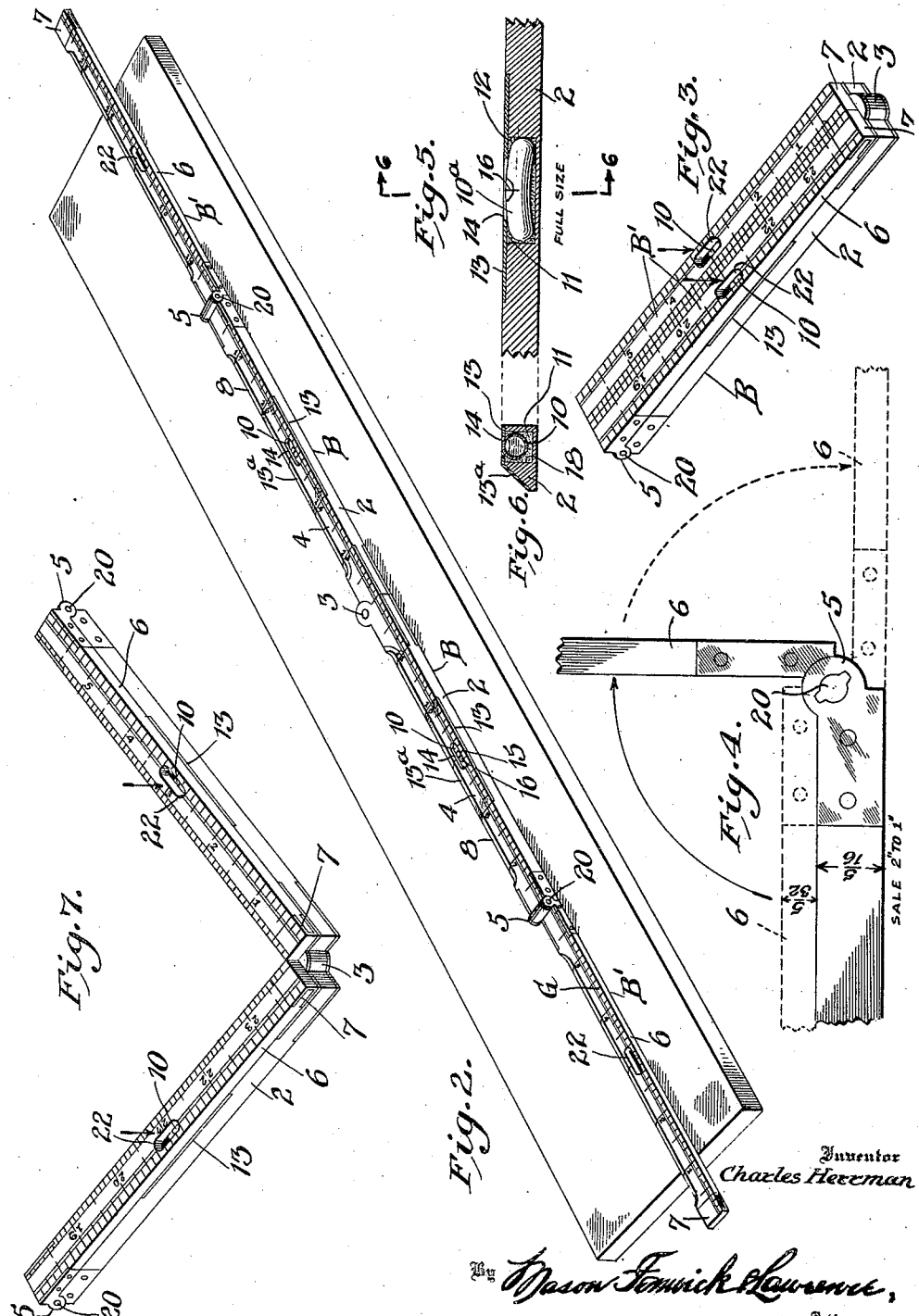
Inventor
Charles Herrman Patented Jan. 9, 1923.

1,441,350

UNITED STATES PATENT OFFICE.

CHARLES HERRMAN, OF NEW YORK, N. Y.

CROSS-TEST LEVEL AND RULE.

Application filed March 19, 1919. Serial No. 283,447.

*To all whom it may concern:*

Be it known that I, CHARLES HERRMAN, a citizen of the United States, residing at 42 West 117 Street, New York, in the county of New York and State of New York, have invented certain new and useful Improvements in Cross-Test Levels and Rules; and I do hereby declare the following to be a full, clear, and exact description of the invention, such as will enable others skilled in the art to which it appertains to make and use the same.

This invention relates to instruments of precision and more particularly it pertains to levelling instruments.

Spirit levels comprise the combination, usually, of a suitable straight-edged or plane surfaced element on or in which there is embodied a spirit glass or vial, a sufficient quantity of the spirit being put in the vial to leave an air bubble. Hence, as is well known, gravity acts on the spirit so that the air bubble always seeks the highest point in the vial, and therefore when the instrument is applied to a plane surface the bubble serves to indicate level. When the spirit glasses or vials are longitudinally curved, for accuracy the convex surface of the curved vial must be made the highest point in all directions of the instrument, transversely as well as longitudinally. In the finer class of levelling instruments two separate spirit glasses or vials are combined in the one instrument on lines substantially at right angles to each other for the purpose of providing a cross-test, thereby indicating that the plane on which the instrument may be supported is level in more than one direction horizontally. Obviously, those types of spirit levels in which the longitudinally curved vial is employed may give an erroneous indication when the levelling instrument is canted or tilted transversely with the resultant effect of causing the bubble, which should be at the highest point when the instrument is level, to shift. And, equally, it is essential in the making of a leveling instrument that the spirit glass or vial be associated or incorporated with very careful regard both as to its horizontal and angular relation to the base surface to get exact accurate reading for level.

It is therefore one of the objects of the present invention to provide a simple, practicable, durable and inexpensive instrument for accurately indicating that a surface or plane is level in one or more directions horizontally by a single setting of the instrument and without requiring any further movement or adjustment by affording simultaneously a cross-test indication as for instance of the level both longitudinally and transversely of the surface being tested. Another object of the present invention is to provide a cross-test levelling instrument capable of being collapsed or folded into a compact position of parts and which may, by its inherent construction, serve as, and has the further object of providing, a means for double checking in the levelling of the instrument by the cooperation of dual spirit vials or levels which may be arranged laterally in parallelism side by side or which may be arranged in co-axial positions. In other words, it is the object of the invention to provide a double vial spirit level for checking the individual glasses one against the other in lateral relation and to provide a level instrument having a maximum area broad base to assure accuracy and further to provide a levelling instrument extensible in length and having dual interchecking spirit levels.

Further objects of the invention are, to provide a leveling device which is extremely compact in construction and which has its several faces free from undesirable protuberances which, when present, naturally interfere with various uses to which the instrument may be applied as well, also, making it inconvenient to handle; and to provide a structure giving maximum bearing area of base plane by utilizing the width dimension, of the beam, instead of the edge dimensions as the base surface. A further object is to provide an improved level and rule combination conforming, as nearly as possible, to standard, present construction of 4-section, 2-foot rules.

Another object of the present invention is to provide a combined spirit level and folding rule of a plurality of sections in which certain of the sections have wholly embodied therein the spirit level means, thus protecting the level glasses or vials against injury and also forming substantially unobstructed, smooth and plain, foldably connected sections and elements so that the combination therewith of the spirit glasses or vials does not in any wise detract from the full utility of the rule as a measuring instrument. Another object of the invention is to provide a cross test level having sections foldably connected with each other and to arrange, in certain of the sections, in a wholly embodied and practically concealed and protected manner, spirit glasses or vials, the sections being so proportioned and foldably connected and related that while certain of the sections may be thicker than other elements, yet the several foldable members may be extended in a continuous line to secure the maximum length of measuring function and also present one continuous and uninterrupted, smooth face the length of the rule.

Another object of the invention is to present and retain, at the sides of the instrument, two straight line, unbroken and uninterrupted edges as for measuring, ruling and observation, by placing of the spirit vial in longitudinal line somewhat medial to the rule's width.

Another object of the invention is to provide for the effectual protection of the embedded spirit vials or glasses in their respective positions in the level sections or elements; and further, to provide for the utilization of the protecting means of the spirit glasses as component elements of the graduated rule faces so that the combination of the protecting means does not interfere with the continuity of the graduations of the respective faces of the rule.

With these and other objects in view, as will be rendered manifest to those versed in the art, the invention consists in the construction, the combination, and in details and elements of the parts as more particularly described in the following specification relative to the accompanying drawings in which:

Figure 1 illustrates the improved level as applied for indicating the level of a plane in two directions at right angles to each other.

Figure 2 shows the instrument in fully extended position so that the dual spirit glasses are utilized to check each other in indicating the level of a plane in one direction.

Figure 3 is a perspective view of the completely folded rule or collapsible level showing the end elements overlapping the intermediate sections and indicating how the subjacent level glasses can be observed through the overlaid top elements without requiring the unfolding of the sections.

Figure 4 is an end elevation on an enlarged scale, of a portion of the instrument showing clearly the form of the hinge joint connecting the end elements to the intermediate sections.

Figure 5 is a longitudinal, vertical section through a fragment of a rule section indicating the method of mounting the spirit glass or vial.

Figure 6 is a cross section on line 6—6 of Fig. 5.

Figure 7 is a perspective view of the cross-test level with the intermediate sections adjusted at right angles and with the outer end elements overlapping the top faces of the sections.

While I have shown my improved level as embodied in combination with a standard and well-known folding rule of the four-section type, it is obvious that it may be used in a combination of elements entirely without any surface indicia or with any suitable surface indicia and also that it may be utilized in elements suitably connected and related to permit the designated adjustment of the parts one to the other and furthermore it is to be understood that this may be embodied in a folding structure constructed of any suitable material.

I have shown the instrument as comprising a rule having intermediate sections 2—2 of suitable width, thickness and length and which are connected to move in a common plane edgewise about a pivotal connection or joint 3 of the well-known rule butt joint type so that faces 4—4 of the rule or folding elements may be brought into edgewise juxtapositions as when the instrument is collapsed (Fig. 3) or may be moved outwardly about the pivot 3 to the position shown in Fig. 2 and the edges 4—4 brought into alinement. Hingedly connected to the swinging ends of the sections 2—2 as by hinges 5—5 are end elements or end sections 6—6 which if desired may be, and preferably are, provided with end wear plates 7 of the usual well-known form. The axes of the hinges 5—5 are, as shown, set transversely to the length of the sections 2 and elements 6 so that these may be swung into longitudinal, overlapping positions. The face of the rule shown in Figs. 1 and 2 is provided with any suitable graduation lines or indicia, indicated at G, and, if desired, the edges 4 of the folding members of the level or rule may be downwardly bevelled, as at 8, so as to provide a thin reading portion to increase the accuracy of measurements made along the graduations G on the upper face of the rule, and a more easily readable level indication by arranging the line or lines indicating position by the bubble in the spirit vial at level coincident with a graduation mark or with graduation marks on the bevel face.

I have provided the combination with suitable folding members of a dual set of horizontal, indicating means which are, as here shown, in the form of the well-known spirit level glass character, indicated at 10, Figs. 5 and 6, these glasses or vials being, preferably, respectively wholly embedded in sections on opposite sides of the hinge or joint 3, preferably in sections 2—2 and are fixedly secured, as by cement, which is indicated at 11, or otherwise.

Spirit level glasses or vials are of various types and proportions and diameters and I have preferred to show the type of glass or vial which is longitudinally curved or which has a convex surface $10^a$ thereby increasing the accuracy and facility with which level may be indicated. In the preferred illustrated embodiment of the invention, the vials 10 are completely set in pockets 12 and cemented as at 11, and to protect the same against injury and also to facilitate accurate observation I prefer to apply to the top surface of the folding sections protecting or guarding plates 13, which preferably extend from edge to edge of the intermediate section on which they may be mounted, and when these top faces are bevelled down, as at $13^a$, to conform to the bevel of the face. From the above it will be seen that there are no projecting parts on the surfaces of the sections. The guard plate is shown as provided with an oval or longitudinal aperture or window 14, extending just above the crest of the vial 10, so that the bubble may be readily seen. The level is constructed in organization with elements having face indicia or graduations G, and I prefer that the guard plates 13 be exactly of a length equal to one or more of the unit graduations; in this case each plate being two inches long, so that it may have its central portion provided with an index line 15 coordinate with the respective scale unit line at the point centrally between the ends of the guard plate. This index line 15 also coincides with an index mark or line 16 at the crest of central portion of the level glass or vial. While the foregoing describes the preferred embodiment of the invention, obviously, considerable modification may be had without departing from the spirit and scope of the invention.

In the preferred embodiment the intermediate sections 2 of the folding instrument as somewhat thicker (say $\frac{5}{16}$) than the end elements 6 (say $\frac{5}{32}$ thick) see illustrated enlarged in Fig. 4, and for the purpose of enabling all of the sections and elements to be fully extended in alinement and at the same time present one continuous, smooth and plane bottom or base B, I have utilized a peculiar form of hinge 5 connecting adjacent ends of one section 2 and an end element 6. This hinge is formed of usual hub portions which are arranged along an axis or pivot shaft 20 which is shown as disposed in the medial plane between the upper surface at $B^1$ in Figure 3 and the base surface B of the folded elements so that when the element or elements 6 are outwardly folded the surface $B^1$ thereof will come into the plane of the surface B of the intermediate sections 2.

The end elements 6—6, when folded over, serve to guard the level vials and they are provided with windows or apertures 22 disposed to be brought into juxtaposition with the level vials or glasses 10 when the end elements 6 are folded over as shown in Fig. 3, so that the instrument may be utilized as a level without requiring the opening of the top sections in the position shown in Fig. 1 the vials being readily observed by looking downwardly as indicated by the arrows in Fig. 3.

From the above, it will be seen that I have provided a compact foldable or collapsible pocket spirit level which enables the observation and deduction of level in two directions horizontally from 0° to 180° and particularly as shown in Figs. 1 and 7 at 90° or what is known as cross-test leveling at a simultaneous reading and setting of the instrument, thus obviating the changing of position of the instrument to determine level in more than one direction; and also, I have provided a level having a double checking feature, which is the result of providing two foldably connected plane sections or members as parts 2—2 which when brought into parallelism (Fig. 3) check the vials against each other in their indication; and also double the efficiency of the device by virtue of the increase in the width of the base B of the level. Further, the instrument is serviceable as checking in observations by reason of the capacity for extension of the level sections 2—2 into alinement with one another as shown in Fig. 2 so as to further increase the accuracy of the reading by having the double levels presented in alinement when taking a level in one direction.

What I claim is:—

1. A combined folding rule and leveling instrument, comprising a section having an under base surface and an upper reading face, a level indicating vial imbedded in said section below the reading face thereof; and a second section, having a base surface and an opposite reading face, pivoted to one end thereof by a hinge parallel with said base surfaces, said second section being thinner than the first section measured between said base surface and said reading face and said hinge being so disposed that the second section may fold over the vial on the first section or extend in alinement with said first section so that their under base surfaces are then co-planar.

2. A combined folding rule and cross-test level, comprising four sections of greater width than thickness hinged end to end so as to fold in parallel relation to each other, or to open in alinement with their base surfaces in a common plane, the intermediate sections being hinged together so as to open and close edgewise with respect to each other, and the other sections being hinged to fold flatwise upon the intermediate sections; and two level-indicating vials mounted, respectively, in sections on opposite sides of the hinge connecting the intermediate sections, each vial being similarly horizontally and angularly disposed with respect to the base surface of the section on which it is mounted so as to indicate level when said base surfaces are horizontal.

3. A combined folding rule and leveling instrument comprising intermediate sections pivoted together so that their under base surfaces are constrained to occupy a common plane in all relative positions, each of said sections having a level indicating vial fully imbedded within its surfaces and visible through the upper reading face of said section; and end sections pivoted to the intermediate sections at the ends remote from their common pivot so as to fold upon the upper reading faces of the intermediate sections over the vials.

4. A combined folding rule and level comprising a section having a level indicating vial imbedded below a surface thereof and visible therethrough, a second section pivoted to said first mentioned section so as to fold upon said surface over said vial, and means whereby said vial is rendered visible through said second section when the latter is folded over it.

5. A levelling instrument comprising a pair of intermediate sections pivoted at one end to each other to swing edgewise, outer or end elements hinged to the swinging ends of the intermediate sections to fold over the face of the same; and levelling means sunk in the faces of the said sections; the other elements having windows through which the said means may be observed.

In testimony whereof I affix my signature.

CHARLES HERRMAN.